(12) United States Patent
Yu

(10) Patent No.: US 6,443,524 B1
(45) Date of Patent: Sep. 3, 2002

(54) BICYCLE SADDLE HAVING A SHOCK-ABSORBING STRUCTURE

(76) Inventor: Tsai-Yun Yu, No. 1-2, Lane 1147, Sec. 1, Chung San Road, Ta Chia Chen, Taichung Hsien (TW)

( * ) Notice: Subject to any disclaimer, the term of this patent is extended or adjusted under 35 U.S.C. 154(b) by 0 days.

(21) Appl. No.: 09/849,250

(22) Filed: May 7, 2001

(51) Int. Cl.$^7$ .................................................. B62J 1/02
(52) U.S. Cl. ..................... 297/209; 297/195.1; 297/211
(58) Field of Search .............................. 297/195.1, 204, 297/206, 207, 208, 209, 210, 211, 212

(56) References Cited

U.S. PATENT DOCUMENTS

| | | | | |
|---|---|---|---|---|
| 2,279,817 A | * | 4/1942 | Faulhaber | 297/212 |
| 3,884,525 A | * | 5/1975 | Mesinger | 297/212 |
| 3,905,643 A | * | 9/1975 | Lamkemeyer | 297/212 |
| 5,294,174 A | * | 3/1994 | Bigolin | 297/212 |
| 5,775,710 A | * | 7/1998 | Yu | 297/195.1 X |
| 6,007,148 A | * | 12/1999 | Yu | 297/211 X |

FOREIGN PATENT DOCUMENTS

EP          1 078 846 A1    2/2001

* cited by examiner

*Primary Examiner*—Peter M. Cuomo
*Assistant Examiner*—Stephen Vu
(74) *Attorney, Agent, or Firm*—Browdy and Neimark, P.L.L.C.

(57) ABSTRACT

A bicycle saddle is provided with a lightweight and quiet shock-absorbing structure and is formed of a main body which is provided in the bottom with a support frame which is fastened at a U-shaped loop portion thereof with a narrow front end of the main body, and at two support arms thereof with the bicycle frame. The two support arms are separated from the main body by a distance and are fastened with a connection seat. Two shock-absorbing block bodies are disposed between the connection seat and a wide rear end of the main body such that the block bodies are in contact with the underside of the main body and the top of the connection seat.

18 Claims, 3 Drawing Sheets

BICYCLE SADDLE HAVING A SHOCK-ABSORBING STRUCTURE

FIELD OF THE INVENTION

The present invention relates generally to a bicycle saddle, and more particularly to a bicycle saddle having a shock-absorbing structure.

BACKGROUND OF THE INVENTION

The conventional bicycle saddle has a narrow front end and a wide rear end which is the saddle main body. The main body is provided in the bottom with a metal bar which is curved to form a support frame having a U-shaped loop portion and two support arms extending from the loop portion. The loop portion is fixed at the underside of the front end of the main body such that the rear ends of the two support arms are fastened securely with two sides of the underside of the rear end of the main body, with the midsegment of the support arm being separated from the underside of the main body by a distance and fastened with the seat post of the bicycle frame. Two metal coil springs are held between the rear of the bottom of the main body and the two support arms for absorbing the shock brought about by the bicycle in motion. Such conventional bicycle saddle as described above is defective in design in that the metal coil springs are incapable of absorbing shock efficiently, and that the metal coil springs give an added weight to the saddle. In light of the coil springs being fastened at two ends with the main body and the support frame by means of screws, the metal coil springs are apt to make noise by friction at the time when the coil springs are compressed and decompressed to bring about the shock-absorbing effect.

SUMMARY OF THE INVENTION

It is the primary objective of the present invention to provide a bicycle saddle with a means to absorb shock uniformly and effectively.

It is another objective of the present invention to provide a bicycle saddle with a shock-absorbing structure which is simple in construction and light in weight.

It is still another objective of the present invention to provide a bicycle saddle with a shock-absorbing structure which is quiet while in operation.

In keeping with the principle of the present invention, the foregoing objectives of the present invention are attained by the bicycle saddle comprising a main body on which a bicyclist is seated. The main body is provided at the bottom with a support frame, which is made of a metal bar by bending and is provided with a U-shaped loop portion and two support arms extending from the loop portion. The loop portion is fastened with the underside of the narrow front end of the main body. The two support arms are joined with the bicycle frame such that the two support arms are separated from the underside of the main body by an appropriate distance. The support arms are fastened at the rear end with a connection seat. Two elastic block bodies are held between the connection seat and the wide rear end of the main body such that the block bodies are respectively connected at the top and the bottom thereof with the underside of the main body and the top of the connection seat, and that the block bodies are elastically compressed by an external force exerting thereon. The two block bodies serve as means to absorb shock that is brought about between the main body and the bicycle frame.

DETAILED DESCRIPTION OF THE INVENTION

Figure 1:
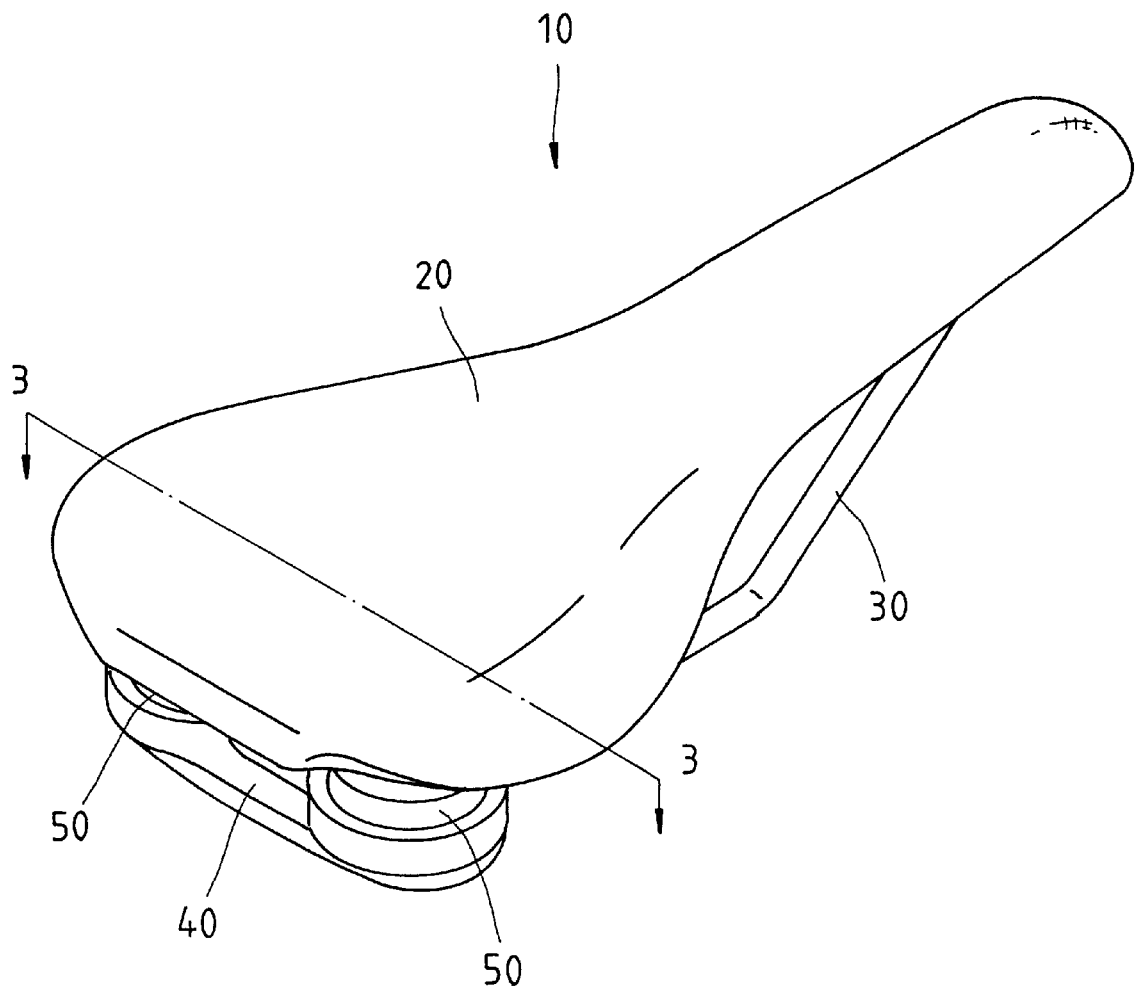
FIG. 1 shows a perspective view of a preferred embodiment of the present invention in combination.
Figure 2:
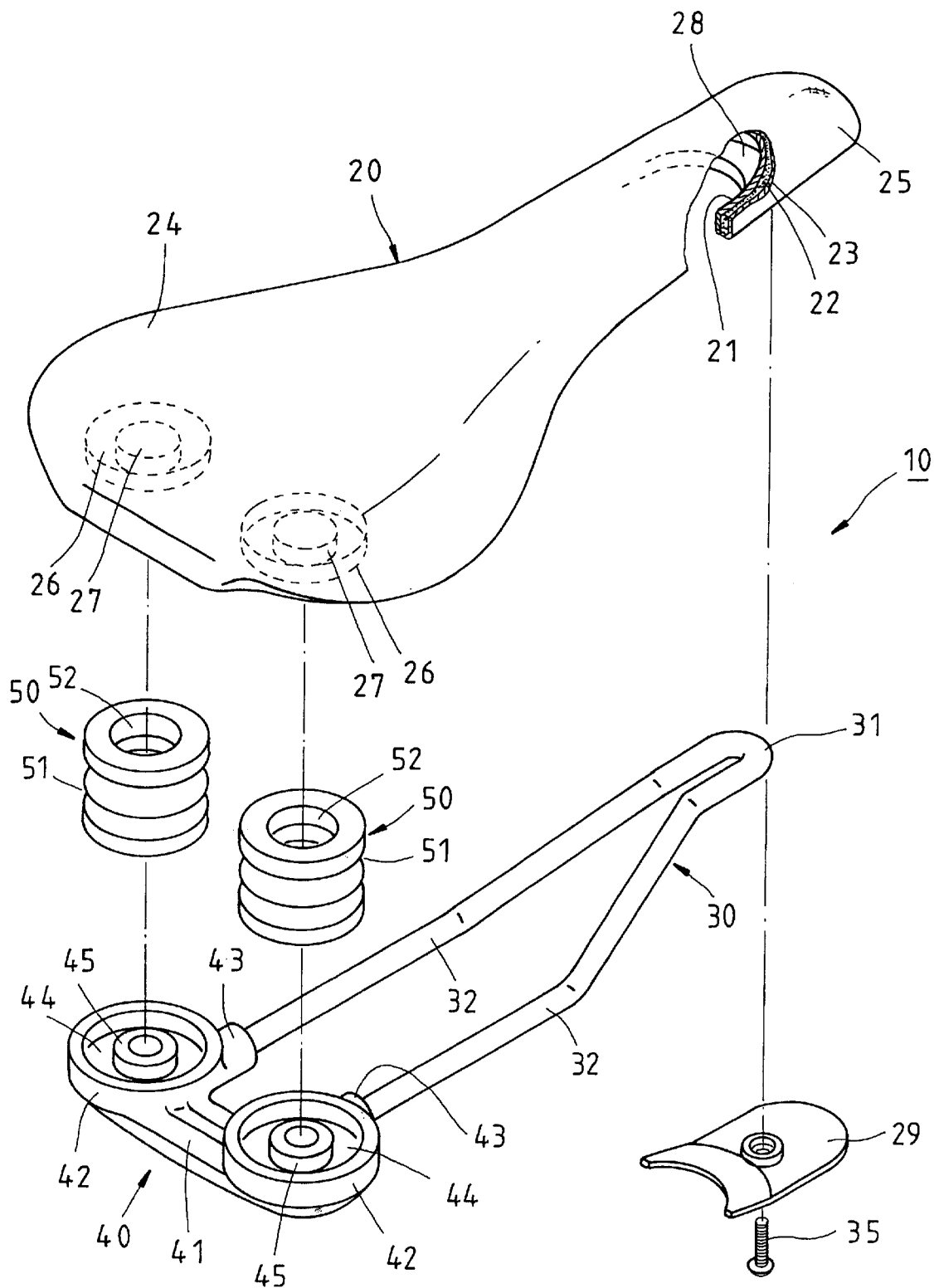
FIG. 2 hows an exploded view of the preferred embodiment of the present invention.
Figure 3:
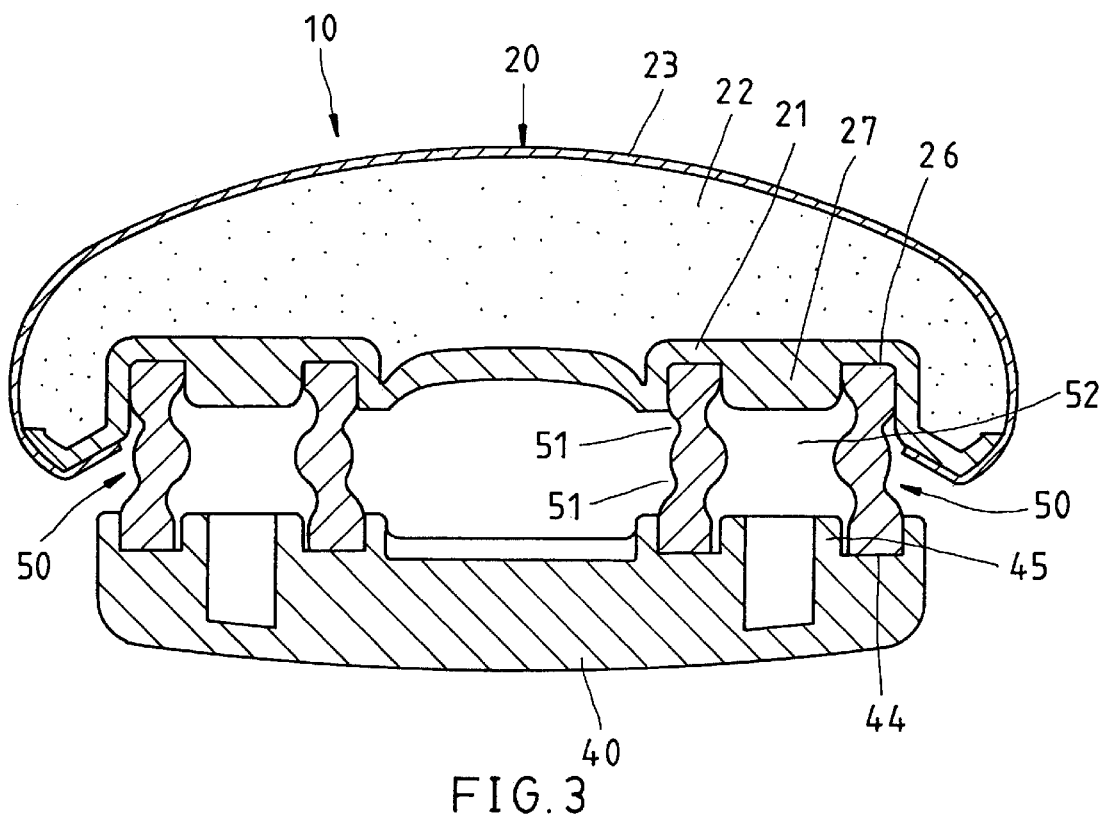
FIG. 3 shows a sectional view taken along the direction indicated by a line 3—3 as shown in FIG. 1.

As shown in FIGS. 1–3, a bicycle saddle 10 embodied in the present invention is formed of a main body 20, a support frame 30, a connection seat 40, and two elastic block bodies 50.

The main body 20 is similar in construction to that of the conventional bicycle saddle and is formed of an inner shell 21 of a rigid plastic material,a middle layer 22 of a foam material, and a surface layer 23 of a fabric material. The main body 20 has a wide rear end 24 and a narrow front end 25. The main body 20 is provided in two opposite sides of the underside of the wide rear end 22 with a round upper insertion slot 26 which is in turn provided at the center thereof with a protruded pillar 27. The main body 20 is provided in the underside of the narrow front end 25 thereof with a connection slot 28.

The support frame 30 is made of a metal bar by bending and is provided at the center with a U-shaped loop portion 31, and two support arms 32 extending from two ends thereof and symmetrical to each other. The support frame 30 is mounted right under the main body 20 such that the loop portion 31 is received in the connection slot 28, and that the support arms 32 are kept an appropriate distance away from the underside of the main body 20. After the loop portion 31 is lodged in the connection slot 28 of the main body 20, the front end of the underside of the main body 20 is provided with a press cover 29 fastened therewith by a screw 35.

The connection seat 40 is integrally made of a rigid plastic material and has a body 41, which is provided at two opposite ends with a disklike side end portion 42 which is in turn provided at the front side with a sleeve 43 extending therefrom and facing forward, and at the top with a round lower insertion slot 44 having at the center thereof a protruded pillar 45 extending upwards. The connection seat 40 is disposed at the rear end of the bottom of the main body 20 such that the rear ends of the two support arms 32 are securely fitted into the two sleeves 43, and that the two lower insertion slots 44 are opposite in location to the two upper insertion slots 26 of the main body 20.

The block bodies 50 are made of a plastic foam material, such as a microcellular polyurethane elastomer containing polyester alcohol and naphthalene disocyanate. The elastic block bodies 50 are of a cylindrical construction and are provided in the periphery with two annular grooves 51, and in the center with a through hole 52 extending along the longitudinal direction thereof. The block bodies 50 are disposed between the connection seat 40 and the main body 20 such that the two block bodies 50 are opposite in location to each other, and that two ends of the top and the bottom of the block bodies 50 are inserted into the upper insertion slots 26 of the main body 20 and the lower insertion slots 44 of the connection seat 40 in conjunction with an adhesive, and that the ends of the block bodies 50 are flush with the undersides of the insertion slots 26 and 44. The protruded pillars 27 and 45 of the upper insertion slots 26 and the lower insertion slots 44 are extended into the through holes 52 of the block bodies 50 such that the tail ends of the protruded pillars 27 and 45 are separated from each other by an appropriate distance at such time when the block bodies 50 are not exerted on by an external force.

The bicycle saddle 10 of the present invention is mounted on the bicycle seat post by means of a mount (not shown in the drawing) which holds securely the two support arms 32 of the support frame 30.

Figure 4:
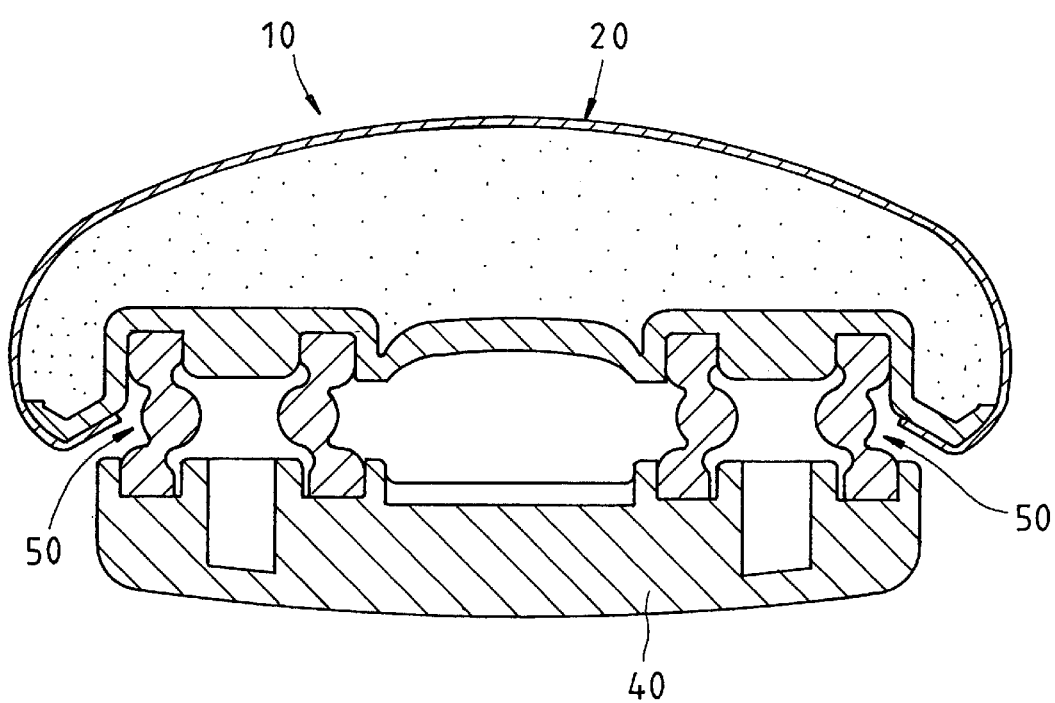
FIG. 4 is similar to FIG. 3 for showing the bicycle saddle and the bicycle frame being exerted on in relation to each other.

As shown in FIGS. 3 and 4, the two elastic block bodies 50 are securely located under two opposite sides of the main body 20 to serve as shock-absorbing bodies which are compressed to absorb shock that is brought about by the bicycle in motion. When the bicycle is operated on a bumpy road, the shock is more severe due to the main body 20 being exerted on by a severe upward force of the bicycle seat post on which the saddle 10 is mounted. The annular grooves 51 of the block bodies 50 serve to enable the block bodies 50 to compress effectively to absorb the shock, as shown in FIG. 4. As soon as the block bodies 50 are relieved of the external force exerting thereon, the compressed block bodies 50 return to their original shape. The block bodies 50 are relatively light in weight and quiet while in action.

What is claimed is:

1. A bicycle saddle comprising:
   a main body having a front end and a rear end having a width greater than the width of said front end;
   a support frame disposed at a bottom of said main body and formed of a U-shaped loop portion fastened with the front end of an underside of said main body, and two support arms extending from said loop portion such that said support arms are kept at an appropriate distance away from the underside of said main body;
   a connection seat located at the rear end of the bottom of said main body and provided with a body which is in turn provided at two opposite ends thereof with a side end portion connected therewith such that said side end portion is fastened with one end of one of said two support arms; and
   two elastic block bodies disposed between said main body and said connection seat such that said two elastic block bodies are opposite in location to each other, and that said block bodies are in contact at a bottom thereof with atop of said side end potion of said connection seat, and further that said block bodies are in contact at a top thereof with the underside of the rear end of said main body;
   wherein said underside of said rear end of said main body and said top of said side end portion of said connection seat are provided with an insertion slot for receiving an end portion of said block bodies.

2. The bicycle saddle as defined in claim 1, wherein said bottom and said block bodies are attached by an adhesive to said underside of said rear end of said main body and said top of said side end portion of said connection seat.

3. The bicycle saddle as defined in claim 1, wherein said block bodies are provided in a periphery with a plurality of annular grooves.

4. The bicycle saddle as defined in claim 1, wherein said block bodies are made of a plastic foam material.

5. The bicycle saddle as defined in claim 4, wherein each of said block bodies is a microcellular elastomer of polyurethane.

6. The bicycle saddle as defined in claim 5, wherein said elastomer contains polyester alcohol and naphthalene diisocyanate.

7. A bicycle saddle comprising:
   a main body having a front end and a rear end having a width greater than the width of said front end;
   a support frame disposed at a bottom of said main body and formed of a U-shaped loop portion fastened with the front end of an underside of said main body, and two support arms extending from said loop portion such that said support arms are kept at an appropriate distance away from the underside of said main body;
   a connection seat located at the rear end of the bottom of said main body and provided with a body which is in turn provided at two opposite ends thereof with a side end portion connected therewith such that said side end portion is fastened with one end of one of said two support arms; and
   two elastic block bodies disposed between said main body and said connection seat such that said two elastic block bodies are opposite in location to each other, and that said block bodies are in contact at a bottom thereof with a top of said side end potion of said connection seat, and further that said block bodies are in contact at a top thereof with the underside of the rear end of said main body;
   wherein said block bodies are provided with a longitudinal through hole;
   wherein said underside of said rear end of said main body and said top of said side end portion of said connection seat are provided with a protruded pillar which is extended into said through hole of said block bodies, with said protruded pillars being separated from each other by a distance at such time when said block bodies are not deformed.

8. The bicycle saddle as defined in claim 7, wherein said bottom and said block bodies are attached by an adhesive to said underside of said rear end of said main body and said top of said side end portion of said connection seat.

9. The bicycle saddle as defined in claim 7, wherein said block bodies are provided in a periphery with a plurality of annular grooves.

10. The bicycle saddle as defined in claim 7, wherein said block bodies are made of a plastic foam material.

11. The bicycle saddle as defined in claim 10, wherein each of said block bodies is a microcellular elastomer of polyurethane.

12. The bicycle saddle as defined in claim 11, wherein said elastomer contains polyester alcohol and naphthalene diisocyanate.

13. A bicycle saddle comprising:
   a main body having a front end and a rear end having a width greater than the width of said front end;
   a support frame disposed at a bottom of said main body and formed of a U-shaped loop portion fastened with the front end of an underside of said main body, and two support arms extending from said loop portion such that said support arms are kept at an appropriate distance away from the underside of said main body;
   a connection seat located at the rear end of the bottom of said main body and provided with a body which is in turn provided at two opposite ends thereof with a side end portion connected therewith such that said side end portion is fastened with one end of one of said two support arms; and
   two elastic block bodies disposed between said main body and said connection seat such that said two elastic block bodies are opposite in location to each other, and that said block bodies are in contact at a bottom thereof with a top of said side end potion of said connection seat, and further that said block bodies are in contact at a top thereof with the underside of the rear end of said main body;

wherein said side end portions of said connection seat are provided with a sleeve extending therefrom such that said sleeve is fitted over one of said two support arms of said support frame.

14. The bicycle saddle as defined in claim 13, wherein said bottom and said block bodies are attached by an adhesive to said underside of said rear end of said main body and said top of said side end portion of said connection seat.

15. The bicycle saddle as defined in claim 13, wherein said block bodies are provided in a periphery with a plurality of annular grooves.

16. The bicycle saddle as defined in claim 13, wherein said block bodies are made of a plastic foam material.

17. The bicycle saddle as defined in claim 16, wherein each of said block bodies is a microcellular elastomer of polyurethane.

18. The bicycle saddle as defined in claim 17, wherein said elastomer contains polyester alcohol and naphthalene diisocyanate.

* * * * *